Figure 4:
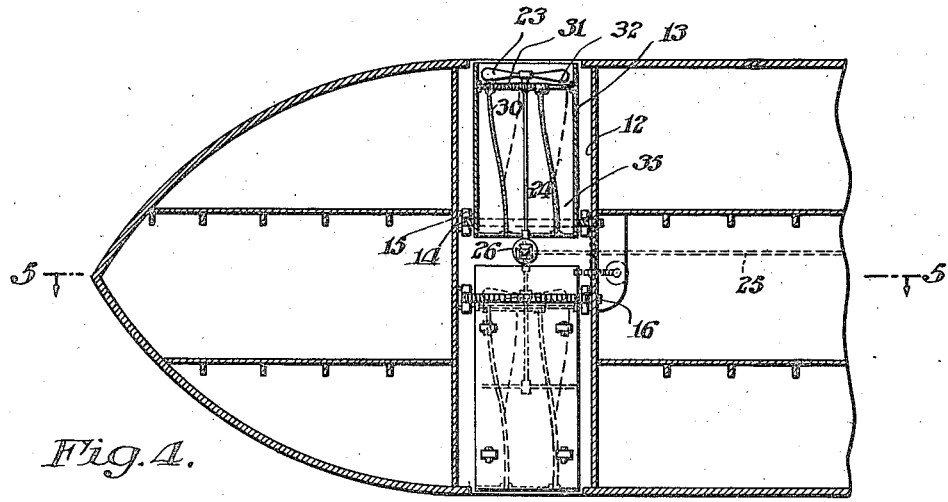

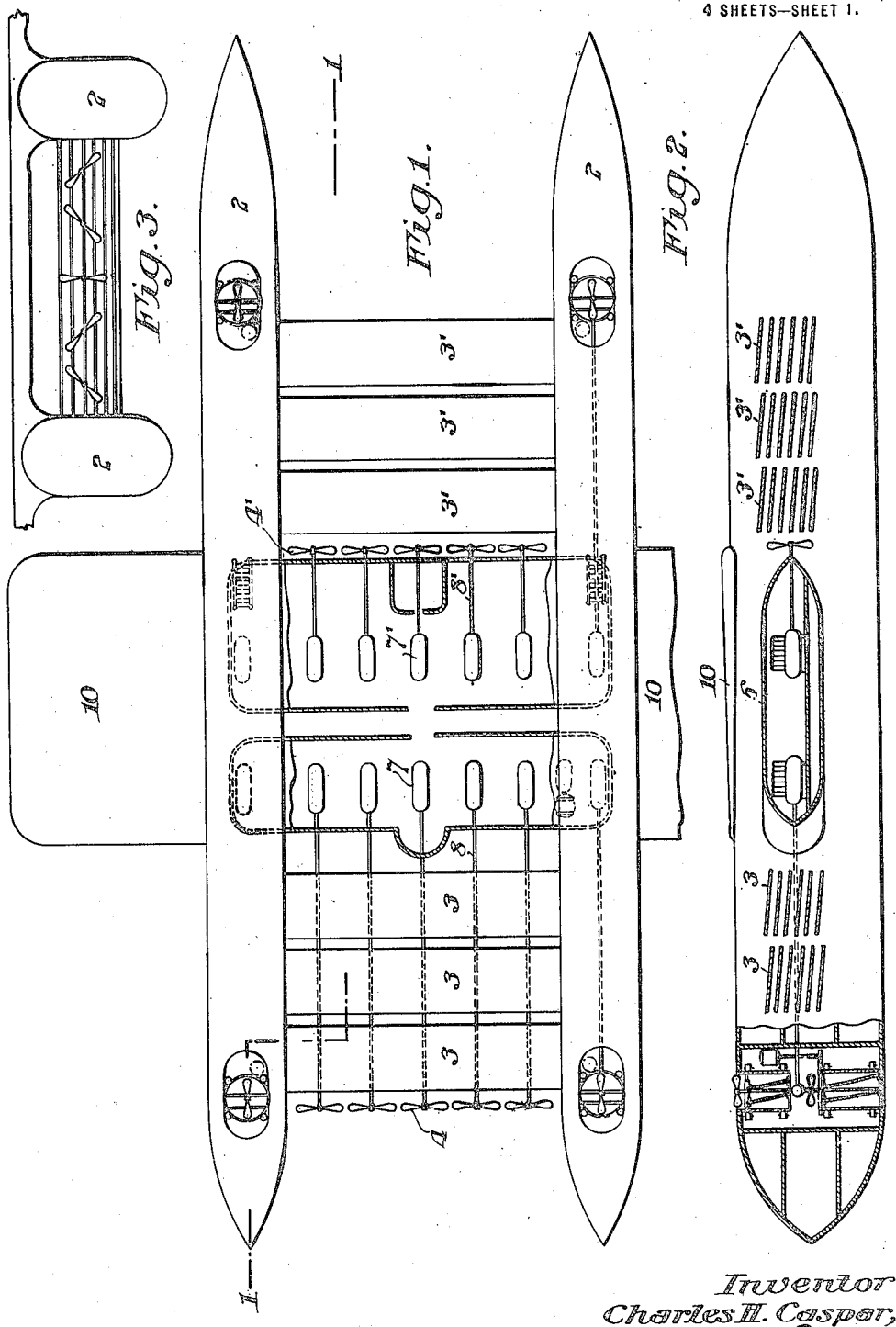

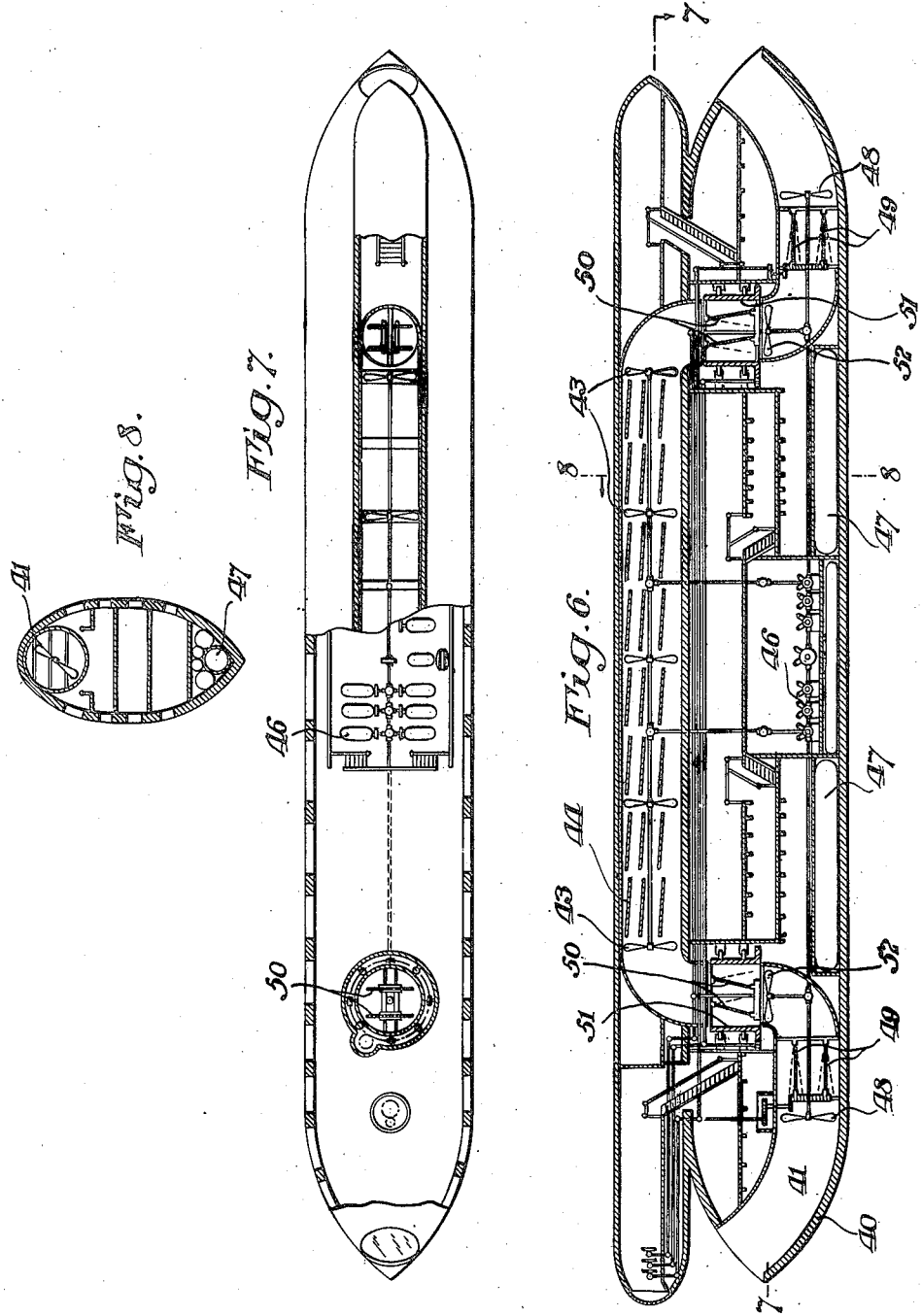

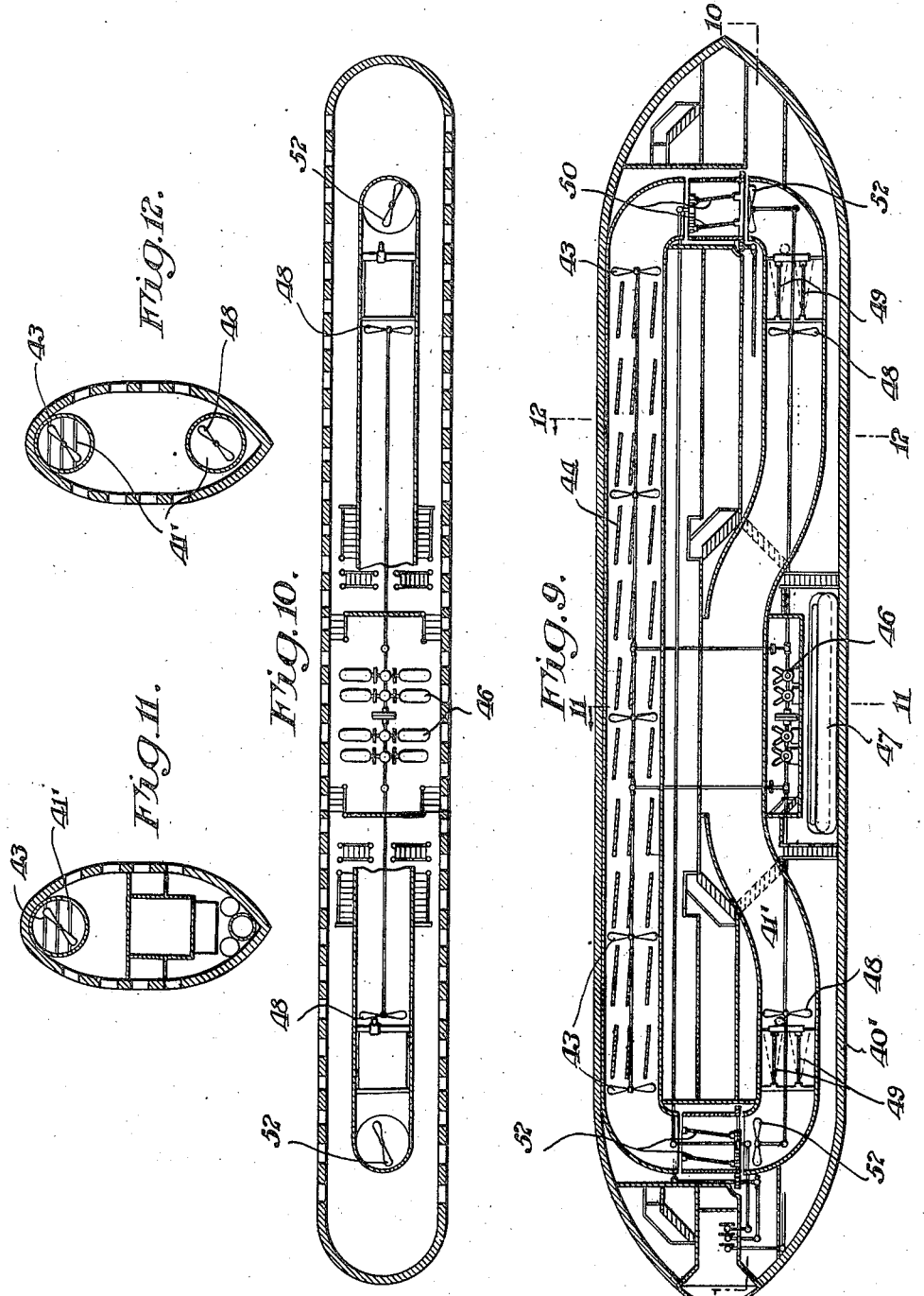

UNITED STATES PATENT OFFICE.

CHARLES H. CASPAR, OF PHILADELPHIA, PENNSYLVANIA.

AIRCRAFT.

1,373,409. Specification of Letters Patent. Patented Apr. 5, 1921.

Application filed August 28, 1919. Serial No. 320,358.

*To all whom it may concern:*

Be it known that I, CHARLES H. CASPAR, a citizen of the United States, and a resident of the city of Philadelphia, county of Philadelphia, and State of Pennsylvania, have invented certain new and useful Improvements in Aircraft, of which the following is a specification, reference being had to the accompanying drawings.

My invention relates to aircraft, and more especially to what are ordinarily known as "heavier than air" machines, and among the principal objects of the invention are to provide an aircraft in which the power is employed in a novel manner whereby the efficiency of the aircraft, both as to its lifting power and as to its propelling power, is materially increased over any type of aircraft at present constructed or known. A further object of my invention is to provide an aircraft in which the power may be utilized at will for exerting a lifting force or a propelling force and which shall embody means whereby the power may be distributed between, and employed in, lifting and propelling the aircraft in such proportions as may be desired. Further objects of my invention are to provide an aircraft having maximum stability and in which a given lifting effort or propelling effort may be accomplished with an amount of power very materially less than the amount required to perform an equal amount of work in heavier than air machines as at present constructed. In consequence, I am enabled by the employment of my invention to provide an aircraft which is capable of sustaining a greater load, of traveling at a greater speed with a given amount of power and of being more easily controlled than any type of aircraft constructed in accordance with the methods employed in present practice.

My invention further comprises all of the various other novel objects and features of construction and arrangement hereinafter referred to more in detail and particularly pointed out in the appended claims.

The various advantages of my invention arise, primarily, by reason of a novel principle of applying power, peculiarly adapted for use in connection with aircraft, although the same may be utilized in various other ways in the mechanic arts. This principle which I have discovered and which I believe to be broadly new both in theory and in application, rests on the fact that when a propeller, for example of the type generally employed in connection with aircraft, is positioned between a pair of walls or disks, arranged preferably in planes normal to its axis of rotation, the walls or disks being of the same or larger area than the diameter of the propeller, the latter will have the same thrust in the air or other fluid in which it is located as though the walls or disks were not so positioned adjacent the propeller. Furthermore, I have discovered that the efficiency of the thrust of the propeller remains constant, whatever be the speed at which the propeller and its adjacent disks are moved through the air which surrounds them, or, in other words, the thrust of the propeller between the walls or disks is uneffected by the speed of an air current passing the walls or disks, as there are always formed between the disks what I term a "static zone" in which the air has no velocity due to relative movement between the disks and the surrounding atmosphere.

In the construction of my improved aircraft I take advantage of the principle to which I have briefly referred, and so arrange and position certain of the propellers that their power is exerted not in the external atmosphere, as in present constructions, but upon a suitable fluid which in ordinary constructions will be air, but in certain constructions may be a fluid heavier than air, for example, water, in a suitable chamber adjacent the propeller provided with means, such as suitable planes adapted to be warped or flexed in any suitable manner, whereby the power delivered by the propeller on the fluid may be directed to exert under certain conditions a maximum lifting effort and under other conditions a maximum propulsive effort as desired and as may be required in the operation of the aircraft. I am thus enabled to so position and locate the means, for example the planes, upon which the power exerted through the adjacent fluid by the propeller is effective to produce the required lifting or propelling effort, so as to employ a given amount of power more effectively and for a greater period of time than is possible in aircraft constructed in accordance with present practice.

For the purpose of enabling those skilled in the art to practise my invention, I have illustrated in the accompanying drawings certain forms of aircraft constructed in accordance therewith and which I will now proceed to describe. Since, as hitherto stated, I believe the application to aircraft of the principles to which I have hereinbefore referred to be broadly new and since, in consequence, the invention may be employed in divers manners and in connection with varying means for accomplishing the results intended, I have, in the accompanying drawings for the sake of clearness, in certain instances omitted such details of construction as concern the particular means employed to effect the control and operation of certain of the parts, as such means may be of any suitable or convenient form as will be readily understood by those skilled in the art, and to this extent the said drawings may therefore be considered as diagramatic rather than as intended to illustrate specific details of construction.

In Figures 1, 2 and 3 I have illustrated one form of aircraft constructed in accordance with my invention, Fig. 1 being a top plan view thereof partially in horizontal section, Fig. 2 a vertical section on the line 1—1 in Fig. 1, and Fig. 3 an end elevation of the front end of the aircraft. Fig. 4 is an enlarged detail fragmentary view in central vertical section of a portion of one of the fuselages shown in Fig. 1 and Fig. 5 a fragmentary horizontal section on line 5—5 in Fig. 4 looking in the direction of the arrows. In Figs. 6, 7 and 8 I have illustrated another form of aircraft embodying my invention, Fig. 6 being a central section thereof, Fig. 7, a horizontal section on the line 7—7 in Fig. 6 looking in the direction of the arrows, and Fig. 8, a transverse vertical section on the line 8—8 in Fig. 6. In Figs. 9, 10, 11 and 12, I have shown a still further modified form of aircraft constructed in accordance with the principles of my invention, Fig. 9 being a central vertical section thereof, Fig. 10 a horizontal section on line 10—10 in Fig. 9, and Figs. 11 and 12 transverse sections on the lines 11—11, 12—12 in Fig. 9.

Figure 5:
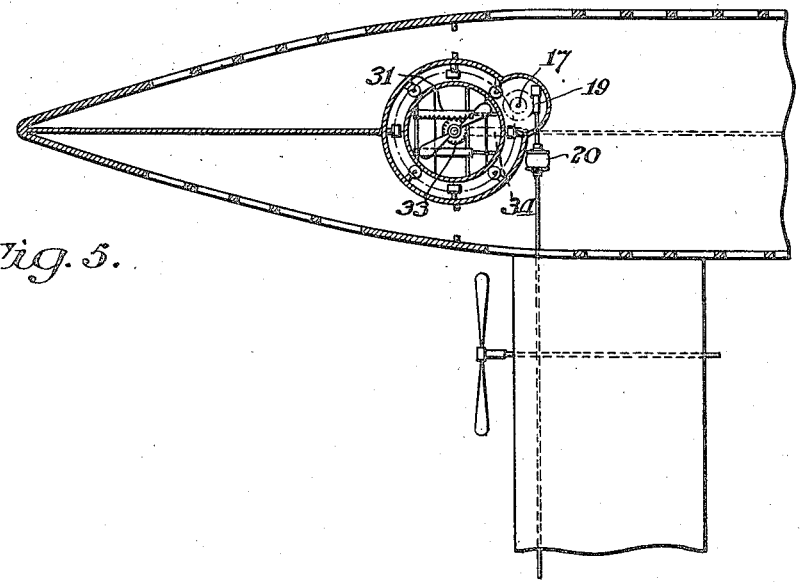

Referring now more particularly to that form of invention shown in Figs. 1 to 3 inclusive, the aircraft therein illustrated may comprise a pair of laterally spaced, substantially parallel fuselages 2, 2 which may preferably be arranged so that they will form pontoons or boats capable of supporting the aircraft on the water when desired. These fuselages are connected by a plurality of planes 3, 3' which are preferably arranged in superposed tiers or sets disposed one behind the other as best shown in Fig. 2, and are adapted to be acted upon by the air currents generated by a plurality of propellers 4, 4' of suitable size and construction, the propellers 4 being positioned in advance of the planes 3 in such manner that the air currents generated thereby will impinge on said planes and the propellers 4' being similarly arranged in advance of the planes 3'. It will be understood that the fuselages 2, 2 serve to support a suitably positioned cabin or compartment 6 which may conveniently extend between the fuselages and in which are positioned a plurality of suitable motors 7, 7' adapted through suitable driving means comprising the shafts 8, 8' to actuate the respective sets of propellers, as will be readily understood by those familiar with the art. The aircraft may also be provided with one or more outwardly extending stabilizing planes 10 which may be arranged in any suitable and convenient manner and which, when the aircraft is in operation, will act in the usual manner for stabilizing and also to some extent, for supporting the aircraft. For the purpose of utilizing my novel method of applying power in my improved aircraft, I employ a plurality of propellers of suitable form arranged for rotation on vertical axes, and position at suitable points within the fuselages in suitable chambers provided for that purpose and arranged adjacent the said propellers, suitable planes adapted to be warped or flexed as desired, in such manner that the air currents generated by the propellers will impinge upon the said planes to produce the required thrust necessary for the propulsion of the aircraft. More specifically, and as best shown in Figs. 4 and 5, I provide at suitable points in each fuselage, and preferably near the forward and rear extremities thereof, a vertical, preferably cylindrical chamber 12, extending entirely through the fuselage, and suitably position within each of said chambers one or more revoluble casings 13 adapted for rotation on a vertical axis. The casings may be positioned within the chamber in any suitable or convenient manner, as, for example, and as shown in the drawings, by providing in each casing an outwardly extending flange 14 which may be supported between rollers 15 secured to suitable pivots fixed in the walls of the chamber, so that the casing, while supported vertically, is capable of revolution about its vertical axis. Any suitable means may be employed to effect the revolution of the casing when desired, those shown comprising a conveniently positioned pinion 16 adapted to mesh with teeth formed on the periphery of flange 14 and mounted on a shaft 17 carrying a suitable worm wheel adapted for engagement with a horizontally positioned worm 19 carried on a shaft driven by a motor 20, the arrangement being such that the motor, when actuated, will serve to turn the casing about its vertical axis. If desired, a suitable reversing gear may be interposed in the mechanism so that the casing may be revolved in either direction, or a pair of independently connected motors arranged to run in opposite directions for this purpose. Within each of the casings 13, and preferably near the upper extremities thereof, is positioned a suitable propeller 23 adapted for rotation on a vertical shaft 24 suitably supported within the casing and actuated from a shaft 25 connected to the propeller shaft through gearing 26, or in any other convenient manner, the propellers if of the same pitch being arranged to rotate in the same direction, or if of opposite pitch then in opposite directions. Within each casing and in coöperative relation with each propeller are arranged a suitable number for example, a pair, of planes or aerofoils 30, and means are provided whereby these planes may be, preferably simultaneously, flexed or warped as desired, so as to present any desired angle of incidence, within limits, to the air currents generated by the propeller. In the form of the invention shown, the means for flexing the planes comprises a sleeve 31 to which one end of each of the planes is attached, which is adapted to slide on a bar 32 fixed to the casing 13. Any suitable means may be adopted for sliding the sleeve on the bar; for example, the sleeve may be provided with teeth adapted to mesh with a pinion 33, suitably supported, and driven through a shaft 34 from any suitable source of power, so that by rotation of the pinion the sleeve will be caused to traverse the shaft longitudinally and the ends of the planes attached thereto will be moved in either direction with reference to the bar, the opposite ends of the planes, of course, being preferably held in fixed position on another bar 35 adjacent the opposite end of the casing. If desired, however, any other suitable and convenient means may be employed for effecting the warping of the planes.

It will be evident with the parts arranged as described, that the casings 13 and with them the contained planes may be rotated when and as desired, so that the relation of the planes 30 to the axial line of the fuselage may be varied, and in addition, that no matter what the position of the casing, the planes may be warped in the casing transversely to the axis of rotation of the casing and to the, generally, coinciding axis of rotation of their adjacent propellers from substantially the position shown in full lines in Fig. 4 to the position shown in dotted lines therein, and may be rigidly held in these positions, or in any intermediate position, as may be desired, thereby varying the angle of incidence on the planes of the fluid currents generated by the adjacent propellers and passing through the casing, to thereby modify the thrust exerted on the planes, and which is operative to propel the aircraft through the air as desired; the maximum thrust being exerted when the planes are substantially in the position shown in full and in dotted lines, and no thrust being exerted when the planes are parallel with the axis of rotation of the propeller, which may be termed "normal" position. When the planes are flexed from such normal position toward the position shown in full lines the thrust will increase and tend to force the aircraft ahead, and similarly when the planes are flexed from normal position toward the position shown in dotted lines, the thrust will correspondingly increase but in the opposite direction, thereby tending to reverse the direction of motion of the aircraft so that the thrust will be effective to give the aircraft a rearward movement.

Moreover, by effecting a partial rotation of the casings 13, the direction of the thrust, if it may be so termed, with respect to the axial line of the aircraft, may be varied, so that the latter may be steered from right to left, or vice versa, as desired, by suitable manipulation of the casings and their contained planes, no matter whether the latter be adjusted to propel the aircraft forward or rearwardly at maximum speed or at a speed less than maximum.

In the forms of the invention shown in Figs. 6, 7 and 8 inclusive, no planes corresponding to planes 3, 3′ and stabilizing planes 10 are positioned externally of the aircraft, the latter being entirely self contained in so far as its supporting and propelling planes are concerned and but a single body or fuselage 40 being employed. While the body of the aircraft may be of any desired or suitable form, I prefer to construct the body substantially of the design shown and to provide the same with a suitable, longitudinally extending tunnel 41, which may be conveniently open at each end to the external atmosphere and extend from the forward end of the aircraft, which is at the left hand side in Figs. 6 and 7, to the rear end or stern thereof. While this tunnel may be of any suitable shape and form, I prefer to make the same substantially as shown in Fig. 6, that is, to give the tunnel, which may conveniently be of substantially circular cross section for the greater portion of its length, a downward curve for a short distance adjacent its forward end, to then extend it substantially horizontally, thence vertically upward, thence horizontally adjacent the top of the body for a considerable distance, thence vertically downwardly and thence horizontally and slightly upwardly to its termination at the stern of the aircraft. In the major horizontally extending portion of the tunnel adjacent the top of the body I position a plurality of suitably actuated propellers 43 corresponding to propellers 4, 4′ in the form of the invention shown in Figs.

1 to 3 inclusive, these propellers being arranged to direct currents of air against a plurality of planes 44 arranged within the tunnel, preferably in superposed sets or tiers disposed one behind the other similarly to planes 3, 3' already referred to. These planes serve both as stabilizing and lifting planes when acted upon by the currents of air generated in the tunnel by the propellers 43. It will be understood that these propellers are preferably carried on horizontal shafts and so arranged that they may be operated either independently or conjointly from a suitable source of motive power, such as the motors 46, which may preferably be positioned in the lower part of the body, in which may also be conveniently located the fuel tanks 47 and other accessories necessary for the operation of the motors.

Within each of the minor horizontally extending portions of the tunnel I preferably position a propeller 48 mounted on a horizontal shaft and suitably actuated from the motors, as well as a pair of planes or aerofoils 49, adapted to be warped or flexed similarly to the planes or aerofoils 30 already described, and in the vertically extending portions of the tunnel I also preferably arrange vertically positioned planes or aerofoils 50 in suitable revoluble casings 51 which may be either located within the tunnel or conveniently, and as shown in the drawings, form a part of the wall thereof, the joints, of course, between the revoluble casings and the stationary portions of the tunnel wall being suitably formed to prevent the escape of the fluid from the tunnel. These planes are adapted to be acted upon by fluid currents generated mainly by propellers 52 mounted on vertical shafts and suitably actuated from the motors 46. It will be understood that the mounting and arrangement of the planes or aerofoils 49 and 50 and of the casings 51 in which the aerofoils 50 are contained, may preferably be substantially similar to the method of mounting planes 30 and adjacent casing 13 hitherto described and shown in detail in Figs. 4 and 5, and I therefore, for the sake of clearness, have omitted from Figs. 6 and 7 the details thereof, as it will be understood that the same are such that the planes may be warped or flexed from normal position in which they are parallel to the axis of the tunnel to positions in which the maximum thrust of their adjacent propellers will be exerted; in the case of planes 50, to propel the aircraft forwardly or rearwardly, and in the case of planes 49, to direct the same upwardly or downwardly, as it may be desired, to raise the aircraft from the earth or water at the beginning of a flight or to direct it toward the earth or water at the termination thereof to effect a landing thereon. Moreover, the rotation of the casings 51, similarly to the rotation of the casings 13, to change the relation of the aerofoils or planes within the casings with the relation to the axial line of the aircraft and about the axes of rotation of their adjacent propellers, will be effective to direct the aircraft to the right or left during the flight as may be desired.

In Figs. 9 to 12 inclusive, I have illustrated a still further modified form of the invention, which in most respects is substantially similar to the form just described save that instead of forming the tunnel 41' so that at its forward and rear ends it will be open to the external atmosphere as in the form of the invention shown in Figs. 6, 7 and 8, the tunnel is made continuous, and a constant circulation of the fluid contained in the tunnel maintained therein by the action of the various propellers. It will be understood that when a continuous tunnel is employed fluids other than air may be utilized therein, as, for example, water, the thrust of the propellers thereon and its reaction on the planes and aerofoils contained in the tunnel operating to bring about the desired results of lifting and propelling the aircraft, as in the form of the invention illustrated in Figs. 6 to 8 inclusive, where the tunnel is open at its ends to the external atmosphere and filled with air drawn therefrom.

During the operation of the forms of aircraft shown in Figs. 6 to 12 inclusive, it may not, under certain conditions, be necessary to utilize all of the propellers positioned in the major horizontal portions of the tunnel, and the same are therefore preferably arranged in such manner that they may be operated independently or conjointly. However, the employment of a plurality of propellers operating simultaneously is desirable under most conditions for the purpose of preventing eddy currents in the fluid and to assist in compensating for frictional losses due to the circulation of the fluid in the tunnel, so that I prefer to arrange the propellers for conjoint or individual operation in order that the same may be utilized under operative conditions to the best advantage. Furthermore, when a more dense fluid than air is employed in a closed tunnel of the form shown in Figs. 9 to 12 inclusive, a correspondingly smaller amount of fluid and smaller aerofoils and tunnel may be employed than when utilizing air in an open tunnel of similar proportions, owing to the greater magnitude of pressure it is possible to obtain by the use of the more dense fluid.

It will be understood that while I have described and illustrated herein certain forms of aircraft embodying my invention, I do not intend or desire to thereby limit myself specifically to such forms, as the invention may be embodied with equal facility in other forms and utilized with equal facility in connection with heavier than air and lighter than air machines, as well as for the propulsion of boats, vessels and other craft adapted for flying or for propulsion through the water or upon its surface, and further that the specific arrangement of the mechanism for flexing aerofoils, for rotating the casings and for actuating the propellers may be of any suitable construction or design adapted for obtaining the results desired, and that the configuration and general design of the fuselages, or bodies, may be modified as may be necessary to adapt the same to the different conditions which it is intended to meet in practice, as it will be readily understood that forms suitable, for example, for cargo or passenger service, would not be well adapted for use in military aeronautics or the like, so that the same may be modified or varied from those herein shown without departing from the spirit and scope of the invention as defined in the appended claims.

Having thus described my invention, I claim and desire to protect by Letters Patent of the United States:

1. In an aircraft, the combination of a movable casing, a propeller arranged adjacent said casing and adapted to direct a current of fluid therethrough, a plane within said casing fixed at one end with respect thereto, and means whereby the opposite end of said plane may be moved to cause said plane to assume a position in angular relation to the normal direction of flow of said current.

2. In an aircraft, the combination of a casing, rotatable about its central axis, a propeller arranged adjacent said casing adapted to direct a current of fluid therethrough, a plurality of planes arranged within said casing and normally parallel to the axis thereof, one end of each of said planes being fixed with respect to said casing, means whereby the other ends of said planes may be moved transversely of said casing to cause said planes to assume an angular relation to the central axis of said casing, and means whereby said casing may be axially rotated independently of the position of the planes within said casing.

3. In an aircraft, the combination with a cylindrical, axially rotatable casing open at each end, of a propeller arranged adjacent said casing and operative to cause a current of fluid to pass therethrough, a plurality of planes positioned within said casing and normally lying parallel to the longitudinal axis thereof, one end of each of said planes being fixed with respect to said casing, means whereby the other ends of said planes may be moved to cause said planes to simultaneously approach and recede from said longitudinal axis whereby said planes may be caused to assume an angularly disposed position with respect to said axis, and means whereby said casing may be rotated independently of the position of said planes therein and without disturbing the adjusted relation of said planes with respect to said axis.

4. An aircraft comprising a body, a tunnel within said body, a plurality of propellers mounted in said tunnel to cause a circulation of fluid therein, and a plurality of planes positioned within said tunnel adapted for angular displacement with respect to and for revolution about the axis thereof and arranged to coact against fluid currents generated by said propellers.

5. An aircraft comprising a body, a tunnel within said body, a plurality of propellers arranged within said tunnel, a plurality of sets of superposed planes arranged adjacent said propellers and disposed one behind the other in said tunnel for sustaining the aircraft, means for actuating said propellers, and means comprising propellers and warping planes within said tunnel for propelling said aircraft.

6. An aircraft comprising a body, a tunnel within said body, a plurality of propellers disposed in said tunnel, a plurality of sets of superposed planes disposed one behind the other in said tunnel and adapted to react against a fluid current generated by said propellers, a revoluble casing, a propeller adjacent said casing, and means within said casing operative to react against a fluid current passing through said casing.

7. In an aircraft having a tunnel in the body thereof, a revoluble casing coaxial with said tunnel, a propeller adjacent said casing operative to cause the passage of fluid therethrough, a plane mounted in said casing, and means whereby said plane may be moved to vary the angle of incidence of said fluid on said plane.

8. An aircraft having a body and a tunnel therein filled with fluid, a plurality of propellers in said tunnel operative to cause a flow of said fluid therein, a plurality of flexible planes adjacent said propellers, and means whereby said planes may be simultaneously rotated about the axis of the tunnel and flexed to vary the angle of incidence of said fluid on said planes.

9. An aircraft having a body and a tunnel therein containing a fluid, a plurality of stationary planes in said tunnel, a plurality of propellers in said tunnel operative to cause a movement of said fluid therein, a plurality of movable planes in said tunnel, and means whereby said last mentioned planes may be warped transversely with respect to or rotated about the axis of said tunnel to vary the angle of incidence of said fluid on said planes.

10. An aircraft comprising a body having a tunnel therein, a plurality of propellers in said tunnel operative to cause a movement of fluid in said tunnel, a plane in said tunnel adjacent each of said propellers, means whereby said planes may be flexed in a direction transverse to the axis of said tunnel, and means whereby said planes may be rotated about said axis.

11. An aircraft comprising a tunnel adapted to contain a fluid, a plurality of propellers in said tunnel, a plurality of planes adjacent each of said propellers, means whereby said planes may be flexed with respect to the axis of rotation of said propellers, and means whereby said planes may be rotated about said axis independently of their adjusted position with respect thereto.

12. An aircraft comprising a body having a tunnel extending substantially longitudinally thereof, a plurality of propellers in said tunnel, a plurality of stationary superposed planes arranged adjacent said propellers in said tunnel, a pair of substantially vertically extending movable planes in said tunnel, a propeller adjacent said planes, a pair of substantially horizontally movable planes in said tunnel, a propeller adjacent said planes, and means whereby said movable planes may be flexed transversely of the axes of rotation of their adjacent propellers.

13. An aircraft having a tunnel, a plurality of propellers disposed in said tunnel, a plurality of sets of superposed stationary planes disposed in said tunnel adjacent said propellers, a revoluble casing coaxial with said tunnel, a movable plane disposed within said casing, a propeller adjacent said plane, means for flexing said plane transversely with respect to the axis of rotation of said casing, means for revolving said casing independently of the position of said plane therein, a normally horizontally extending plane in said tunnel, means whereby said plane may be flexed from said normal position, and a propeller adjacent said plane.

14. In mechanism, a tunnel, a revoluble casing coaxial with said tunnel, a propeller adjacent said casing operated to cause the passage of fluid therethrough, a plane mounted in said casing, means whereby said plane may be moved to vary the angle of incidence of said fluid thereon.

15. An aircraft comprising a body, an endless tunnel within said body, a plurality of propellers mounted in said tunnel to cause a circulation of fluid therein, and a plurality of planes positioned within said tunnel adapted to coact against fluid currents generated by said propellers.

16. In mechanism, an endless tunnel, a revoluble casing coaxial with said tunnel, a propeller adjacent said casing operated to cause the passage of fluid therethrough, a plane mounted in said casing, means whereby said plane may be moved to vary the angle of incidence of said fluid thereon.

In witness whereof, I have hereunto set my hand this 26th day of August, 1919.

CHARLES H. CASPAR.